A. T. STIMSON.
DRAG SAW.
APPLICATION FILED MAY 9, 1912.
1,062,200.
Patented May 20, 1913.
3 SHEETS—SHEET 1.
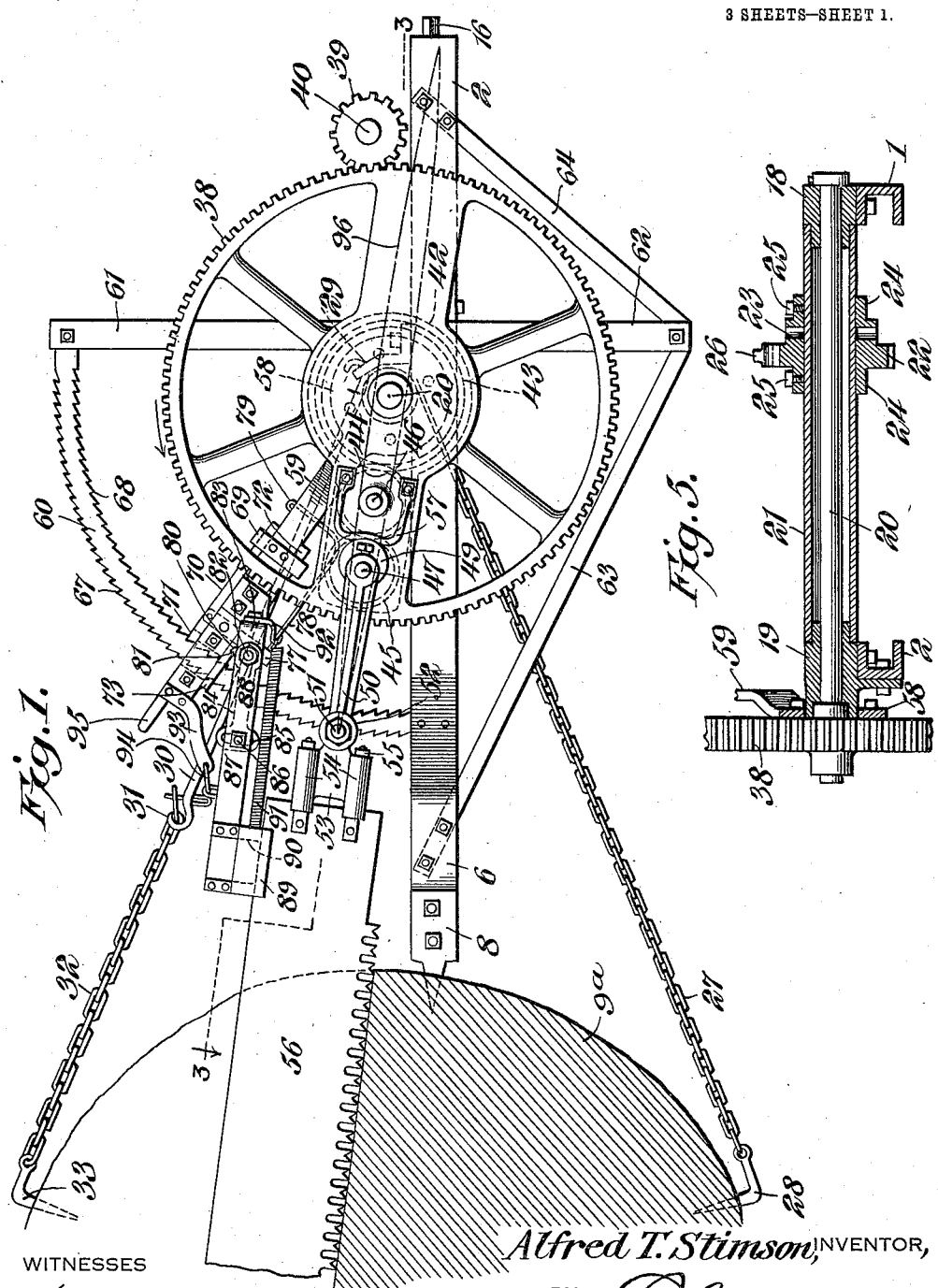
WITNESSES
Howard D. Orr.
H. T. Chapman.
Alfred T. Stimson, INVENTOR,
BY E. G. Siggers
ATTORNEY

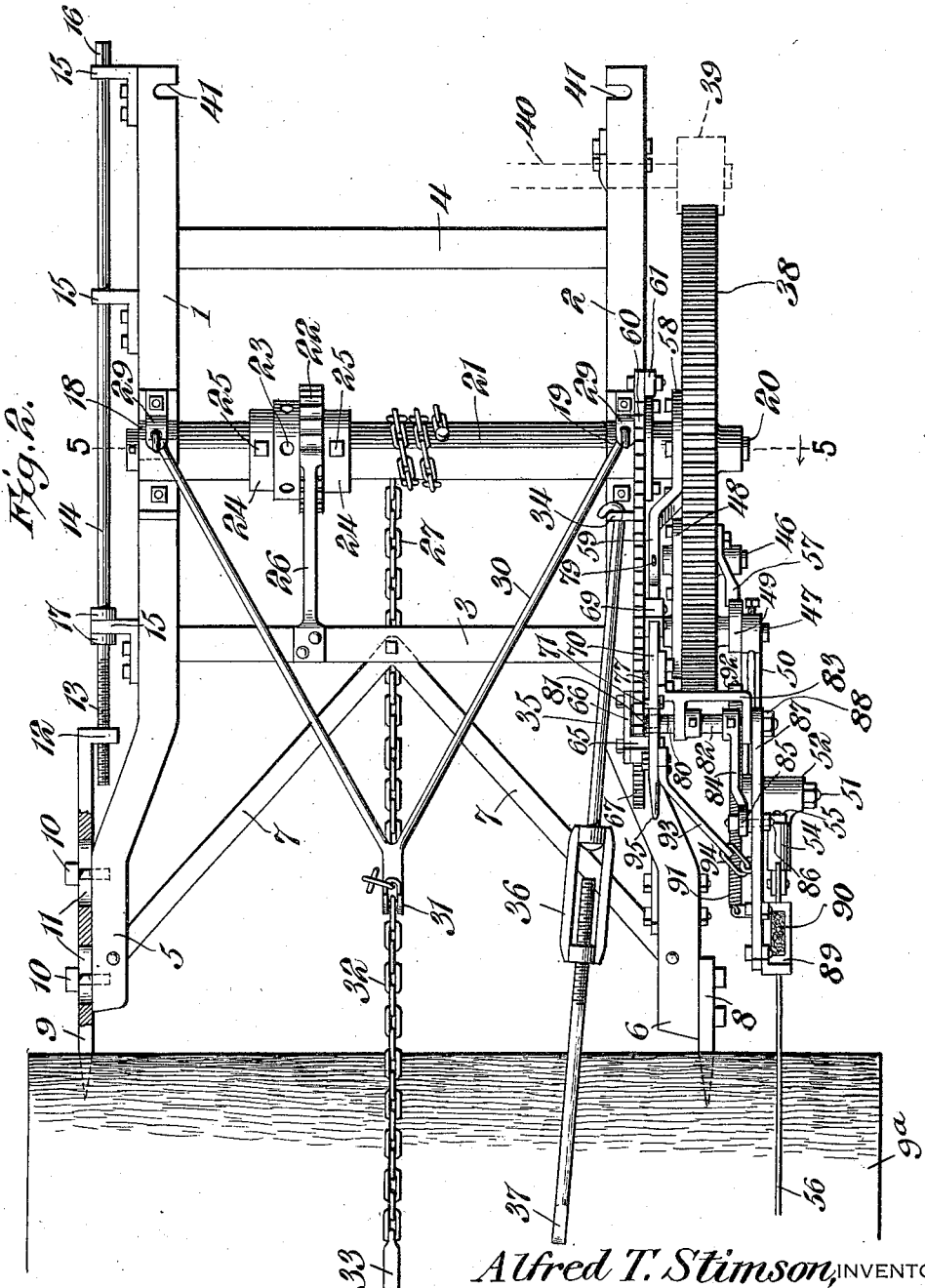

A. T. STIMSON.
DRAG SAW.
APPLICATION FILED MAY 9, 1912.
1,062,200.
Patented May 20, 1913.
3 SHEETS—SHEET 3.
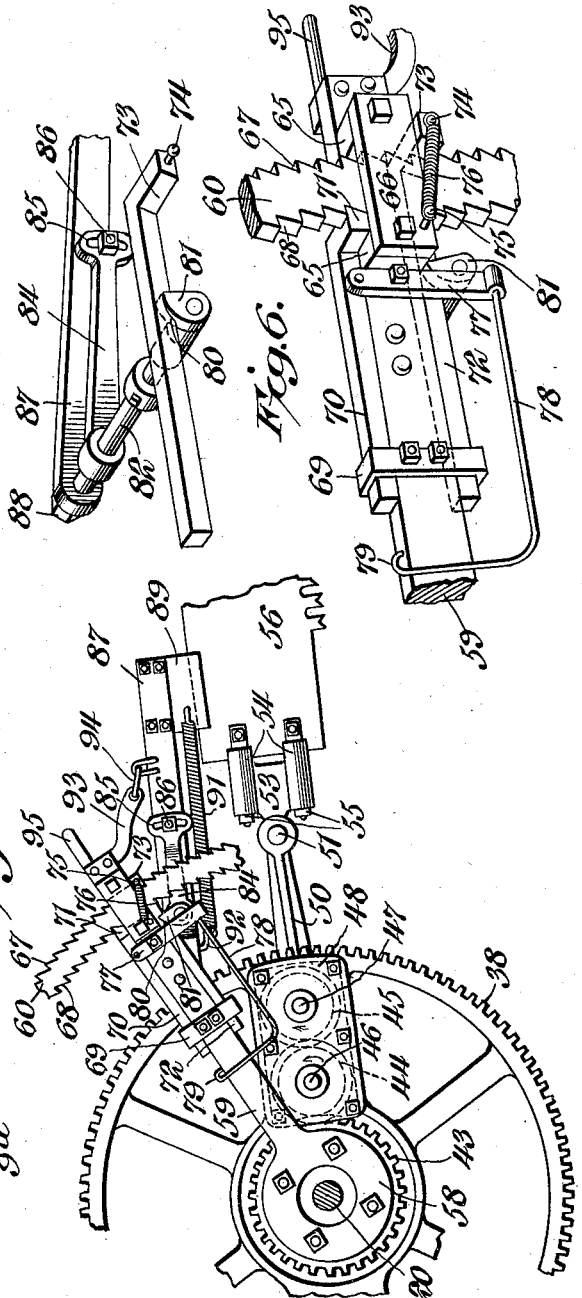
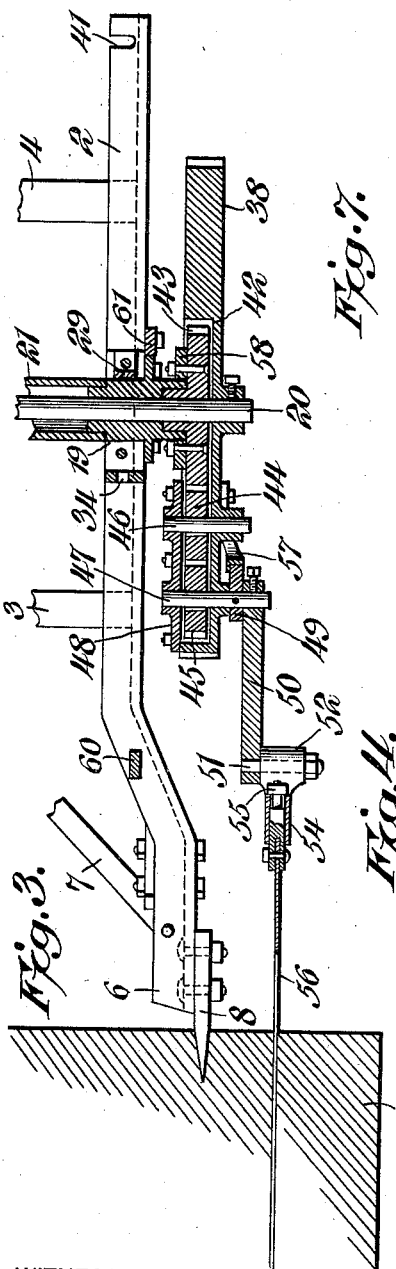
WITNESSES
Howard D. Orr.
F. T. Chapman.
Alfred T. Stimson, INVENTOR,
BY
C. G. Siggers
ATTORNEY

UNITED STATES PATENT OFFICE.

ALFRED THOMAS STIMSON, OF LODI, CALIFORNIA.

DRAG-SAW.

1,062,200. Specification of Letters Patent. Patented May 20, 1913.

Application filed May 9, 1912. Serial No. 696,173.

*To all whom it may concern:*

Be it known that I, ALFRED T. STIMSON, a citizen of the United States, residing at Lodi, in the county of San Joaquin and State of California, have invented a new and useful Drag-Saw, of which the following is a specification.

This invention has reference to improvements in drag saws, and is designed to provide a machine for the purpose which may be readily applied to a log in operative relation thereto, and which will rapidly and automatically cut the log after the initial adjustments have been made.

In accordance with the present invention there is provided a supporting frame with means for securing the frame to a log in such a manner that the saw may be brought into proper relation to the log irrespective of irregularities therein, and also to provide driving means whereby the saw will have a movement similar to a hand operated saw and will automatically feed until the log is severed, the structure being especially adapted for use in connection with a power means, such as a suitable type of explosion engine.

The invention will be best understood from a consideration of the following detailed description, taken in connection with the accompanying drawings forming a part of this specification, with the further understanding that the invention is susceptible of different practical embodiments which may differ in immaterial respects from the showing of the drawings, wherefore the invention is not confined to any strict conformity with the structure illustrated in the drawings but may be changed and modified so long as such changes do not mark a departure from the salient features of the invention.

In the drawings:—Figure 1 is a side elevation of the machine in operative relation to a log, the latter being shown in cross section in the plane of the cut. Fig. 2 is a plan view of the structure shown in Fig. 1 with some parts in section. Fig. 3 is a section on the line 3—3 of Fig. 1, the section being confined to the parts visible in Fig. 1. Fig. 4 is an elevation of a portion of the structure shown in Fig. 1 but viewed from the opposite side, the main shaft being shown in section and the main frame and other parts being omitted. Fig. 5 is a section on the line 5—5 of Fig. 2 with parts omitted. Fig. 6 is a perspective view of a portion of a latch mechanism employed in connection with the machine. Fig. 7 is a perspective view of a portion of the latch mechanism and actuating parts therefor partly omitted from Fig. 6.

Referring to the drawings, there is shown side members 1, 2 and cross members 3, 4, of a frame of general rectangular outline, and which may be made of structural steel both for lightness and strength. For convenience of description that end of the frame which, as will hereinafter appear, is presented toward the log to be sawed, will be designated the front end, while the other end of the frame will be designated the rear end. The side members 1 and 2 diverge near the front end of the frame and terminate in more widely spaced portions 5, 6 than the main portion of the frame. The members 5 and 6 are suitably stiffened by braces 7 extending to one of the cross pieces 3 and other bracings may be used as the exigencies of the structure may demand, large structures requiring a greater amount of bracing than small ones.

Made fast to the end 6 of the side member 2 is a stabbing point 8 designed to enter a log, indicated in the drawings at $9^a$, so as to hold the portion of the frame carrying the point 8 firm with relation to the log. The extension 5 of the side member 1 is also provided with a stabbing point 9 held to the member 5 by screws 10 extending through slots 11 in the body of the stabbing point 9, so that the latter may be moved lengthwise of the member 1 to the extent permitted by the slots 11 and when the desired adjustment is reached the stabbing point may be fastened to the end 5 by tightening the screws 10. That end of the body member of the stabbing member 9 remote from the point thereof has an angle extension 12 suitably threaded for the passage of the threaded end 13 of a rod 14, which rod has bearings in a suitable number of angle brackets 15 fast to the member 1, while the end of the rod 14 remote from the threaded end 13 is squared or otherwise suitably shaped, as indicated at 16, for the application of a suitable tool, whereby the rod may be rotated to cause lengthwise adjustment of the stabbing point 9. The rod 14 is held against longitudinal movement by suitable collars 17 which may engage opposite sides of one of the brackets 15.

The side members 1 and 2 carry bearings 18, 19, respectively, for a shaft 20, and on the bearings there is mounted a drum 21 which may be approximately as long as the space between the side members 1 and 2. The drum carries at an appropriate point the ratchet wheel 22 having a capstan hub 23 provided with appropriate holes for the insertion of capstan bars, whereby the drum may be turned as is found desirable. The ratchet wheel 22 and hub 23 is provided with axial extensions 24 for the passage of set screws 25 by means of which the ratchet wheel is fastened at any appropriate point on the drum 21. A pawl 26 is made fast to the cross member 3 and is designed to engage the teeth of the ratchet wheel 22, this pawl being indicated as a spring pawl, and may be shaped to properly hold the ratchet 22. Secured to the drum 21 is one end of a chain 27, the other end of which carries a dog 28 designed to be driven into the log 9$^a$. Made fast to the bearings 18 and 19 are respective ears 29 to which are hooked the free ends of legs 30 of a yoke formed at the junction points of the legs into a hook 31 designed to receive a chain 32 having at the end remote from the yoke a dog 33 which may be driven into the log 9$^a$, the arrangement being such that the dog 28 may be driven into the lower portion of the log as it lays on the ground, while the dog 33 is driven into the upper portion of the log. By hooking the appropriate link of the chain 22 in the hook 31 after the dog 33 has been driven in place, and turning the drum 21 after the dog 28 has been driven into the log, the main frame may be drawn toward the log, so that the stabbing points 8 and 9 are forced thereinto to the desired extent to hold the parts firmly in place, such adjustments of the stabbing point 9 being made as are necessary to bring the several parts into the proper relation to the log. As a further holding means the side member 2 is provided with an eye 34 to which is hooked one end of a rod 35 including a turn buckle 36, the other end of the rod 35 having a portion 37 designed to be driven into the log, the turn buckle 36 permitting any desired strain to be put upon the rod 31.

The shaft 20 is extended through the bearing 19 and for a distance beyond that side of the side member 2 remote from the side member 1 and there the shaft 5 has fast thereto a gear wheel 38 of appropriate size engaged by a pinion 39 on a shaft 40, which shaft may represent the power shaft of an explosion engine or a shaft of gearing between an explosion engine and the wheel 38. To facilitate the attachment of an explosion engine to the frame of the machine the rear ends of the members 1 and 2 are notched, as indicated at 41, to provide for attaching bolts, whereby an explosion engine may be made fast to the frame members 1 and 2.

The gear wheel 38 is shown in Fig. 3 as provided with a recess or chamber 42 in which are lodged gear wheels 43, 44 and 45, respectively, the train of gear wheels being in substantially radial relation to the gear wheel 38. The gear wheel 43 is concentric with the shaft 20, but is not made fast thereto, being secured to another member to be described. The gear wheels 44 and 45 are mounted upon stub shafts 46 and 47, respectively, each having bearings at one end in the gear wheel 38 and at the other end in a cap plate 48 made fast to the gear wheel 38. The stub shaft 47 is extended a distance beyond the outer face of the gear wheel 38 and there carries a cam 49 and an arm 50, the latter being in the nature of a crank arm carried at one end by the shaft 47. The other or outer end of the crank arm 50 is provided with a wrist pin 51 on which is mounted a collar 52 formed with a lateral extension 53 provided with spaced elongated members 54 through which are passed bolts 55 carrying at the end remote from the collar 52 a saw blade 56 of appropriate nature for the work to be performed. Fast to the outer face of the gear wheel 38 is an elastic bearing member 57 in the path of the cam 49, so that at each revolution of the shaft 47 to which the gear wheel 48, cam 49 and arm 50 are made fast the cam 49 engages the spring member 57, thereby holding the parts against displacement, which might otherwise produce vibration of the saw were they not so held during the operation of the machine.

Fast to the inner face of the gear wheel 43 is the laterally enlarged end 58 of an arm 59 radial with relation to the gear wheel 38. This arm extends to one side of a segmental rack bar 60 fast at one end to the side member 2 and at the other end to a post 61 erected on the side member 2 at an appropriate point back of the shaft 20, and in order to stiffen the side member 2 the post 61 has a downward continuation 62 from which braces 63 and 64 extend to opposite ends of the side member 2 after the manner of a truss, thus greatly strengthening the portion of the main frame withstanding the greater part of the strain.

Fast to the arm 59 adjacent to and on opposite sides of the rack 60 are spacer blocks 65 connected by a plate 66 in such manner as to form a channel through which the rack bar extends. This rack bar is provided on opposite edges with rack teeth 67, 68, respectively, these rack teeth being oppositely directed. Held to the bar 59 by a strap 69 is a sliding pawl 70 terminating in an angle tooth 71 adapted to engage in any of the teeth 68, the pawl 70 being located on what may be termed the upper edge of the arm 59. Similarly arranged on the lower edges of the arm 59 and held thereto by the same strap 69 is another sliding pawl member 72 long enough to extend around the front edge of the rack, and is there formed with a tooth 73 adapted to engage any one of the ratchet teeth 67. The free end of the tooth 73 carries a pin 74, while the plate 66 carries a pin 75, the two pins 74 and 75 receiving the two ends of a spring 76 tending to hold the tooth 73 in engagement with the ratchet teeth 67, but yielding to the passage of these teeth by the tooth 73.

Secured to the sliding pawl 70 is one end of a lever 77 pivoted to the arm 59, and the other end of this lever has one end of a spring 78, the other end 79 of which engages the arm 59, such spring being shaped to yield to longitudinal movements of the pawl 70 and also being operable from the arm 59 for a purpose which will hereinafter appear.

The sliding pawl 72 is provided at an appropriate point with a notch 80 into which engages a finger 81 on a shaft 82 having bearings in a bracket 83 carried by the arm 59 at a point adjacent to the free end of the arm. The shaft 82 also carries an arm 84 having at its free end, for adjustment, a laterally extended eye 85 traversed by a bolt 86 in turn carried by another arm 87, one end of which is pivotally supported by the shaft 82 which projects for the purpose beyond the bracket 83, the arm 87 being held to the shaft by a nut 88 applied to the corresponding end of the shaft 82. This arm carries at its free end a weight 89 shaped to embrace at its lower edge the upper edge of the saw 56, and this weight is also formed with a pocket for a mass 90 of suitable material, such as waste or the like, capable of receiving and retaining lubricant, so that the saw may reciprocate with relation to the weight 89 without undue friction. A spring 91 is made fast at one end to the weighted end of the arm 87, and at the other end to a finger 92 fast to the bracket 83, the tendency of the spring 91 being to hold the weight 89 in engagement with the back edge of the saw.

The free end of the arm 59 has an extension 93 from which extend connected links 94 to the arm 87 to sustain said arm and limit its movement in a direction toward the saw. The free end of the arm 59 is also provided with a handle 95 whereby the arm may be conveniently manipulated.

Let it be assumed that the machine has been adjusted to a log with the arm 59 elevated to an extent permitting the saw 56 to engage the top of the log, and let it further be assumed that the saw is at the extreme of its forward stroke as shown in Fig. 1. If, now, the driving power be started to cause rotation of the gear wheel 38 in a counter-clockwise direction as viewed in Fig. 1, its direction of rotation being indicated by an arrow in said figure, the shaft 47 is given an orbital rotation about the axis of the shaft 20 and is also given a rotative movement about its own axis, since the gear wheel 43 is under the conditions assumed substantially stationary and the gear wheel 44 acts simply as a direction changing idler. Assuming the gear wheel 38 to be moving counter-clockwise and the gear wheel 43 to be standing still, the idler gear wheel 44 will on the rotative movement of the gear wheel 38 in a counter-clockwise direction be moved also in a counter-clockwise direction about its own axis, wherefore motion is imparted to the gear wheel 45 in a clockwise direction, and this same movement is imparted to the arm 50. At the same time, however, the shaft 47 is moving in a counter-clockwise direction orbitally about the shaft 20, wherefore the wrist pin 51 is caused to move in a very flat ellipse, indicated approximately by the dot and dash line 96 in Fig. 1. The very flat elliptical path of the wrist pin 51 is due to the fact that the gear wheel 45 is one-half the diameter of the gear wheel 43 and the wrist pin 51 is spaced from the axis of the gear wheel 45 a greater or less distance than the separation of the axis of the gear wheels 43 and 45. This means that the saw 56 is reciprocated by the rotative movement of the gear wheel 38 in a direction closely approximating a straight line, but from such straight line to an extent determined by the minor axis of the flat ellipse, so that the saw has a rocking movement imparted to it during its reciprocations, thus serving to clear the saw kerf from saw dust, moving it from the center toward and from both ends of the cut. This rocking movement is also utilized to cause the feeding of the saw as it cuts into the log. Each time the weighted end of the arm 87 drops the arm 84 moves with it a short distance, but sufficient to cause the finger 81 to move the pawl 72 to an extent to carry the tooth 73 out of engagement with a ratchet tooth 67, whereupon the weight of the parts will cause the arm 59 to drop, but only for a very limited distance, since the parts are still held by the saw. This dropping movement is, of course, participated in by the pawl 70, but the tooth 71 will yield to the teeth 68, being held thereto only by the spring 78. Before the parts can drop more than the distance of one tooth the saw has rocked sufficiently to cause the tooth 73 to move toward the rack 60, so that the dropping movement is ultimately arrested by the engagement of the tooth 73 with the next lower tooth 67 in order. The movement of the arm 59 causes a corresponding rotative movement of the gears 43, 44 and 45, thus readjusting the reciprocating movement of the saw to the new position of the parts, so that the saw is kept in line with the actuating mechanism at all times while the log is being severed. Suppose, now, that it is desirable to lift the saw to its high position, it is only necessary to release the end 79 of the spring 78 from the arm 59 when the pawl 70 may be moved lengthwise of the arm 59 until its tooth 71 is out of the path of the teeth 68, and then the arm with the saw and other parts carried by the arm may be lifted to as high a position as desired, either by reversing the engine or disconnecting it from the gear wheel 38, so that the saw may be lifted without being reciprocated. On the return of the end 79 of the spring 78 into engagement with the arm 59 the saw is ready to make a new cut.

What is claimed is:—

1. In a drag saw, a gear wheel fixed against rotation, a radially disposed train of gearing in mesh with and mounted to revolve about the gear wheel, a crank arm carried by and fast to the gear of the train of gearing remote from the first-named gear wheel, and a saw secured to the crank arm for actuation thereby, the crank arm and gearing being related to cause the end of the crank arm secured to the saw to describe an elongated flat ellipse.

2. In a drag saw, a rotatable member for the reception of power, a radially disposed train of gearing carried by the rotatable member with one end member of the train of gearing concentric with the axis of rotation of said rotatable member and the other end member provided with a crank arm fast thereto, a saw provided with means for attachment to the crank arm for actuation thereby, and feeding means for the saw connected to the axially disposed gear of the train of gearing and holding the said gear against participation in rotative movements of the rotatable member.

3. In a drag saw, means for imparting a reciprocatory and rocking movement to the saw, and means for feeding the saw to the work comprising a ratchet member, an arm movable along the ratchet member in operative relation thereto, a pawl carried by the arm in position to engage the ratchet member, a rock shaft carried by the arm and provided with engaging means for the pawl, a rock arm carried by the rock shaft and movable therewith, and another rock arm movable independently of the rock shaft and provided with means for engaging the saw, said second named rock arm being connected to the first named rock arm for actuating the latter.

4. A drag saw provided with a train of gearing, a support for one end member of the train of gearing about which said member may move axially, an arm connected to the other end member of the train of gearing and provided with means for attachment to a saw, and feeding means for the saw comprising a relatively fixed rack, an arm carried by the first named end member of the train of gearing, releasable connections between the arm and the rack, rock members carried by the arm in position to be engaged by the saw and in turn controlling the engagement of the arm with the rack, and means for rotating the train of gearing about the axis of the end member of the train to which the arm is connected.

5. A drag saw provided with means for imparting reciprocatory rocking motion to the saw, and means for feeding the saw to the work comprising a relatively fixed ratchet member, an arm in operative relation to and movable with reference to the ratchet member, pawls carried by the arm and adapted to engage the ratchet member, a rock shaft carried by the arm and provided with an engaging means for one of the pawls to move the latter to release position, a rock arm on the shaft, another rock arm movable with relation to the first rock arm and provided with adjusting means for the first named rock arm, and saw engaging means carried by the second named rock arm.

6. A drag saw provided with a rotatable train of gearing having one member relatively fixed against rotation and the other members revoluble about the axis of the first named member, the said train of gearing being in substantially radial relation to the axis of revolution of the train, connections carried by and fast to the outermost member of the train of gearing for actuating a saw, and intermittently acting holding means in operative relation to the outermost member of the train of gearing.

In testimony, that I claim the foregoing as my own, I have hereto affixed my signature in the presence of two witnesses.

ALFRED THOMAS STIMSON.

Witnesses:
W. R. STIMSON,
J. W. EDDLEMAN.

---

Copies of this patent may be obtained for five cents each, by addressing the "Commissioner of Patents, Washington, D. C."